US011376742B2

(12) United States Patent
Kim

(10) Patent No.: US 11,376,742 B2
(45) Date of Patent: Jul. 5, 2022

(54) ROBOT AND METHOD OF CONTROLLING THE SAME

(71) Applicant: LG ELECTRONICS INC., Seoul (KR)

(72) Inventor: Namgeon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 349 days.

(21) Appl. No.: 16/498,324

(22) PCT Filed: May 15, 2019

(86) PCT No.: PCT/KR2019/005850
§ 371 (c)(1),
(2) Date: Sep. 26, 2019

(87) PCT Pub. No.: WO2020/230928
PCT Pub. Date: Nov. 19, 2020

(65) Prior Publication Data
US 2021/0362343 A1 Nov. 25, 2021

(51) Int. Cl.
*B25J 19/02* (2006.01)
*B25J 11/00* (2006.01)
(Continued)

(52) U.S. Cl.
CPC ............. *B25J 11/001* (2013.01); *B25J 9/161* (2013.01); *B25J 9/163* (2013.01); *B25J 9/1653* (2013.01);
(Continued)

(58) Field of Classification Search
CPC ........ B25J 11/001; B25J 13/08; B25J 13/081; B25J 9/0003; G05B 13/027;
(Continued)

(56) References Cited

U.S. PATENT DOCUMENTS

2012/0116584 A1  5/2012  Kim et al.
2012/0185095 A1  7/2012  Rosenstein et al.
(Continued)

FOREIGN PATENT DOCUMENTS

CN       103240749       8/2013
JP       2013537487      10/2013
(Continued)

OTHER PUBLICATIONS

Korean Intellectual Property Office Application Serial No. 10-2019-7020639, Office Action dated Dec. 14, 2020, 5 pages.
(Continued)

*Primary Examiner* — Dalena Tran
(74) *Attorney, Agent, or Firm* — Lee, Hong, Degerman, Kang & Waimey PC

(57) ABSTRACT

A robot includes a display, a sensing unit including at least one sensor for detecting a physical stimulus, and a processor configured to detect the physical stimulus based on a sensing value acquired from the at least one sensor while an operation is performed, identify the physical stimulus based on the acquired sensing value, perform control to stop or terminate the operation based on the identified physical stimulus, and control the display to display a graphical user interface (GUI) corresponding to the identified physical stimulus.

18 Claims, 11 Drawing Sheets

(51) Int. Cl.
*B25J 9/16* (2006.01)
*B25J 13/08* (2006.01)

(52) U.S. Cl.
CPC ........... *B25J 9/1697* (2013.01); *B25J 13/081* (2013.01); *B25J 13/089* (2013.01)

(58) Field of Classification Search
CPC ...... G05B 19/0426; G06N 20/00; G06N 3/02; G06N 3/08; G10L 25/63; G10L 15/16
USPC ........ 700/245; 446/321; 318/568.12, 568.13, 318/568.16; 706/14, 25
See application file for complete search history.

(56) References Cited

U.S. PATENT DOCUMENTS

| | | | |
|---|---|---|---|
| 2017/0095925 A1* | 4/2017 | Yamane | ................. B25J 9/1676 |
| 2018/0104822 A1 | 4/2018 | Yuki et al. | |
| 2018/0133900 A1* | 5/2018 | Breazeal | ................. B25J 19/026 |
| 2019/0206393 A1* | 7/2019 | Fang | ........................ G06N 5/04 |
| 2019/0279070 A1* | 9/2019 | Hayashi | ..................... B25J 5/00 |

FOREIGN PATENT DOCUMENTS

| | | |
|---|---|---|
| JP | 2018062042 | 4/2018 |
| JP | 2018192559 | 12/2018 |
| KR | 20120047577 | 5/2012 |
| KR | 20180115551 | 10/2018 |
| KR | 101954610 | 3/2019 |

OTHER PUBLICATIONS

PCT International Application No. PCT/KR2019/005850, Written Opinion of the International Searching Authority dated Feb. 6, 2020, 11 pages.

* cited by examiner

ROBOT AND METHOD OF CONTROLLING THE SAME

CROSS-REFERENCE TO RELATED APPLICATIONS

This application is the National Stage filing under 35 U.S.C. 371 of International Application No. PCT/KR2019/005850, filed on May 15, 2019, the contents of which are hereby incorporated by reference herein its entirety.

BACKGROUND

1. Field

The present disclosure relates to a robot and, more particularly, to a robot which responds to various types of physical stimuli and a method of controlling the same.

2. Background

A robot may refer to a machine that automatically processes or operates a given task by its own ability. Robot application fields may be generally classified into various fields including an industrial field, a medical field, an aerospace field and an ocean field. Recently, communication robots capable of performing communication or interaction with a human being through voice or a gesture are increasing.

Such communication robots may include various types of robots such as a guide robot disposed at a specific place to provide a variety of information to users or a home robot provided at home. In addition, the communication robots may include an educational robot for guiding or assisting learning of a learner through interaction with the learner.

The communication robot may be implemented to perform interaction with a user or a learner using various components. For example, the communication robot may include a microphone for acquiring sound generated around the robot or a camera for acquiring the image of the periphery of the robot.

Meanwhile, a manufacturer provides a function for outputting emotional change of a robot according to predetermined input or event occurrence through a display or a speaker, in order to more dynamically implement a robot.

In addition, a user may rapidly stop or terminate operation of the robot in an emergency such as reception of a phone call or ringing of a door bell while using the robot. Conventionally, since it is necessary to perform several operations such as entry into a separate menu in order to stop or terminate operation of the robot, it is difficult to rapidly stop or terminate operation of the robot.

SUMMARY

An object of the present disclosure devised to solve the problem lies in a robot disposed in a robot capable of more dynamically responding to various types of physical stimuli.

Another object of the present disclosure devised to solve the problem lies in a robot for providing a method of easily and rapidly stopping or terminating operation of the robot in an emergency while a user uses the robot.

A robot according to an embodiment of the present disclosure includes a display, a sensing unit including at least one sensor for detecting a physical stimulus, and a processor configured to detect the physical stimulus based on a sensing value acquired from the at least one sensor while an operation is performed, identify the physical stimulus based on the acquired sensing value, perform control to stop or terminate the operation based on the identified physical stimulus, and control the display to display a graphical user interface (GUI) corresponding to the identified physical stimulus.

The at least one sensor may include at least one of a touch sensor provided in a head part of the robot, a gyroscope sensor provided in a body part of the robot, or a touchscreen formed integrally with the display.

In some embodiments, the robot may further include a memory configured to store a learning model learned by a learning processor or received from a server, and the processor may identify the physical stimulus corresponding to the sensing value acquired from the at least one sensor through the learning model stored in the memory.

In some embodiments, the memory may store information on priorities of identifiable physical stimuli and performable operations, and the processor may stop or terminate the operation which is being performed or ignore the identified physical stimulus based on priority of the identified physical stimulus and priority of the operation which is being performed.

The processor may stop or terminate the operation which is being performed when the priority of the identified physical stimulus is higher than that of the operation which is being performed, and control the display to display the GUI corresponding to the identified physical stimulus.

The processor may ignore the identified physical stimulus and continuously perform the operation, when the priority of the identified physical stimulus is lower than that of the operation which is being performed.

In some embodiments, the processor may continuously perform the operation when identification of the detected physical stimulus is impossible.

The robot may further include a speaker, and the processor may control the speaker to output voice corresponding to the identified physical stimulus.

The robot may further include a camera, and the processor may recognize a position of a user through the camera in response to the identified physical stimulus and control a rotation mechanism such that the display is directed to the recognized position.

In some embodiments, the GUI may indicate an emotional state corresponding to the identified physical stimulus.

In some embodiments, when detecting that the physical stimulus is repeated a predetermined number of times or more based on the acquired sensing value, the processor may control the display to display a GUI different from a GUI displayed when the physical stimulus is identified once.

A method of controlling a robot according to another embodiment of the present disclosure includes acquiring a sensing value from at least one sensor while an operation is performed, detecting a physical stimulus based on the acquired sensing value, identifying the detected physical stimulus based on the acquired sensing value, performing control to stop or terminate the operation based on the identified physical stimulus, and outputting a graphical user interface (GUI) corresponding to the identified physical stimulus through a display.

DETAILED DESCRIPTION OF THE INVENTION

Figure 1:
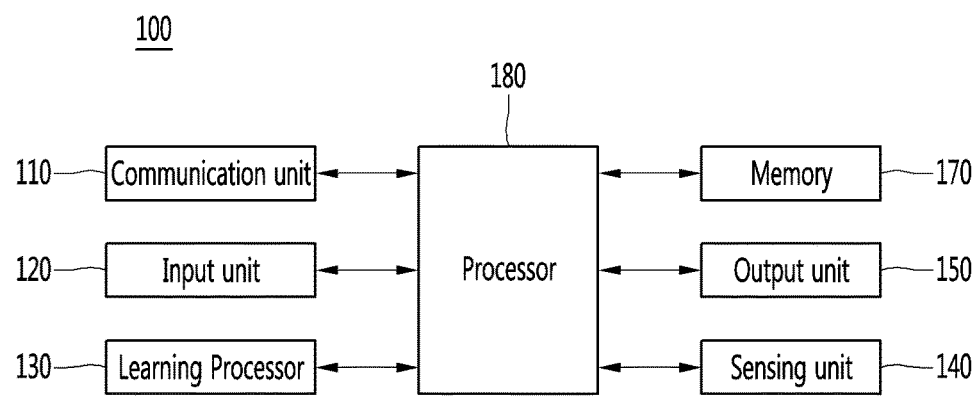
FIG. 1 is a diagram showing an artificial intelligence (AI) device including a robot according to an embodiment of the present disclosure.

Hereinafter, embodiments disclosed in this specification will be described with reference to the accompanying drawings. The accompanying drawings are used to help easily understand the embodiments disclosed in this specification and it should be understood that the technical ideas disclosed in this specification are not limited by the accompanying drawings and include all alterations, equivalents and substitutes within the spirit and scope of the present disclosure.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
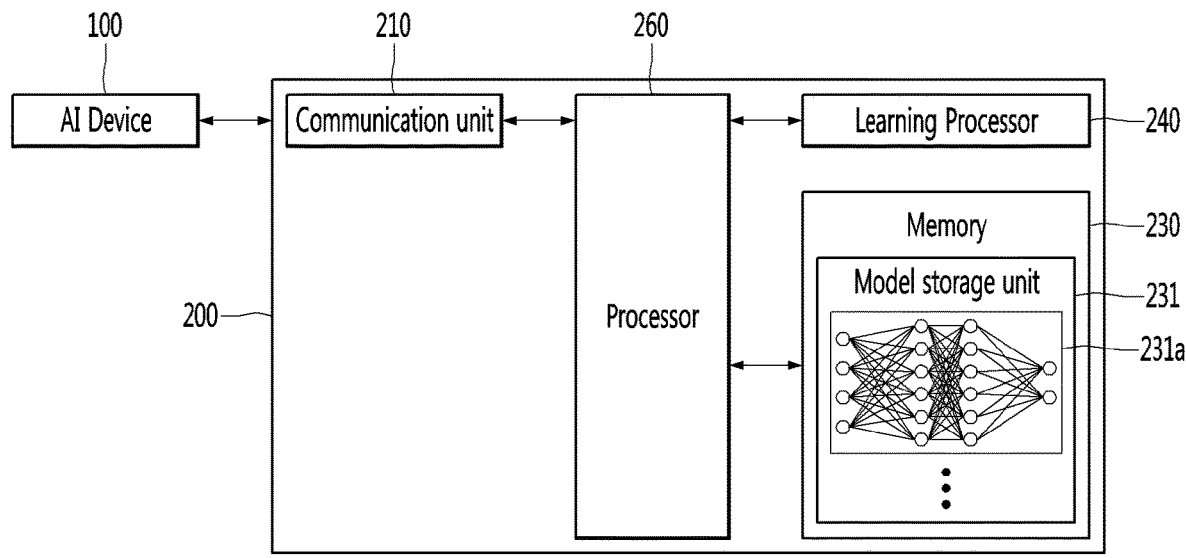
FIG. 2 is a diagram showing an AI server connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
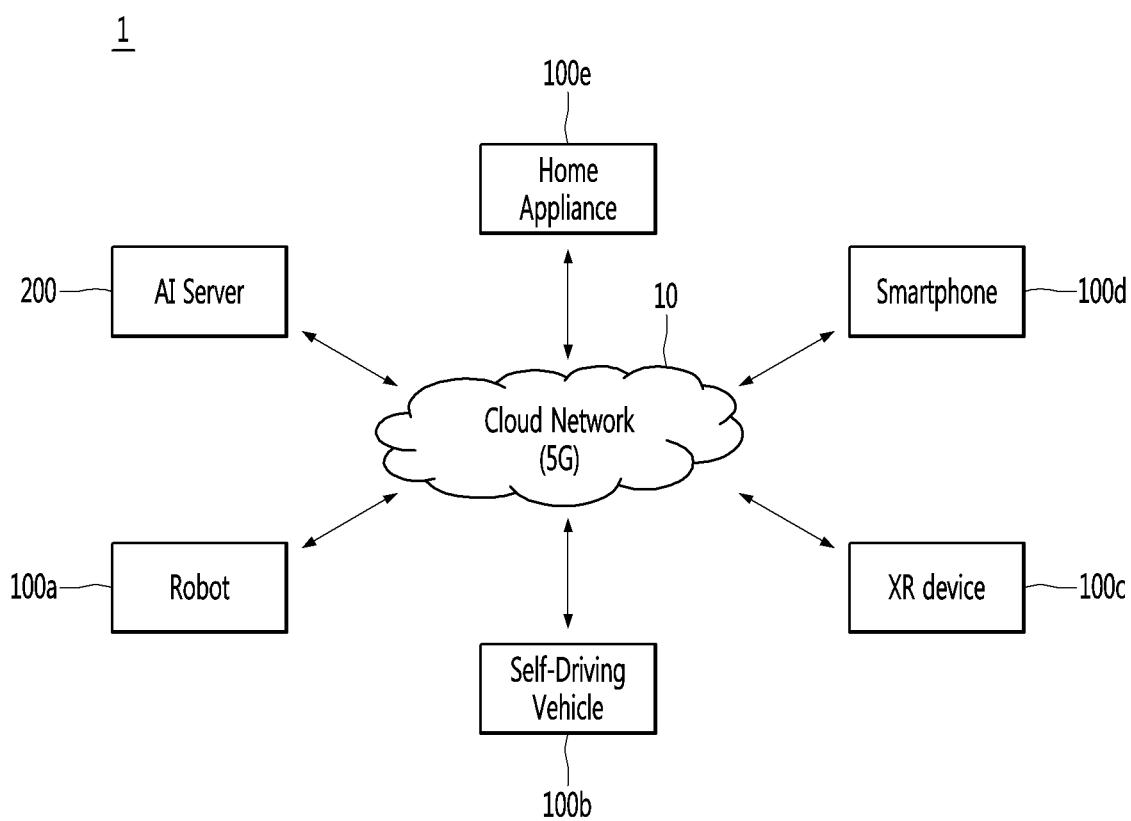
FIG. 3 is a diagram showing an AI system including a robot according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, or the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
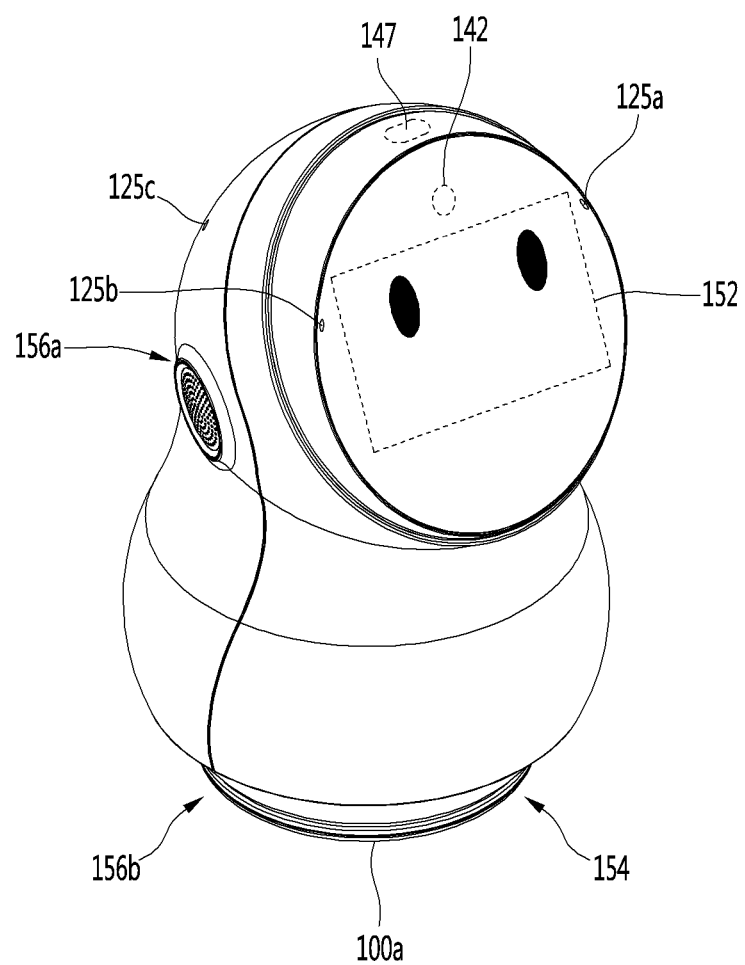
FIG. 4 is a perspective view of a robot according to an embodiment of the present disclosure.

FIG. 4 is a perspective view of a robot according to an embodiment of the present disclosure.

Referring to FIG. 4, the robot 100a may correspond to a communication robot for providing information or content to a user or inducing the user to take a specific action through communication or interaction with the user.

For example, the robot 100a may be a home robot disposed at home. Such a home robot may perform operations such as operation to provide a variety of information or content to a user or operation to monitor an event occurring in the home through interaction with the user.

In order to perform the above-described operations, the robot 100a may include a camera 142 for acquiring an image of the user or the periphery of the robot, at least one microphone 124 (see FIG. 5) for acquiring the voice of the user or the ambient sound of the robot, a touch sensor 147 for detecting touch of a part (e.g., a finger, etc.) of the user's body, a display 152 for outputting graphics or text, a sound output unit 154 (e.g., a speaker) for outputting voice or sound and a light output unit 156 (see FIG. 5) for outputting light having a color or pattern mapped to a specific event or situation.

In order to smoothly acquire the external sound of the robot through at least one microphone 124 implemented inside the robot 100a, the robot 100a may include one or more microphone holes 125a to 125c formed in the outer surface of a cover (or a case). Each of the microphone holes 125a to 125c may be formed at a position corresponding to any one microphone 124, and the microphone 124 may communicate with the outside through the microphone holes 125a to 125c. Meanwhile, the robot 100a may include a plurality of microphones spaced apart from each other. In this case, the robot 100*a* may detect a direction, in which sound is generated, using the plurality of microphones.

The display 152 may be disposed on one surface of the robot 100*a* in one direction. Hereinafter, the direction of the display 152 is defined as the front side of the robot 100*a*. Meanwhile, although the sound output unit 154 is shown as being disposed at the lower side of the robot 100*a*, the position of the sound output unit 154 may be variously changed according to the embodiment.

The light output unit 156 is implemented as a light source such as an LED and may indicate the state or event or the robot 100*a* through change in color or output pattern. Although first light output units 156*a* disposed at both side surfaces of the robot 100*a* and a second light output unit 156 disposed at the lower side of the robot 100*a* are shown in FIG. 4, the number and positions of light output units 156 may be variously changed.

Although not shown, the robot 100*a* may further include a movement unit (traveling unit) for movement from one position to another position. For example, the movement unit may include at least one wheel and a motor for rotating the wheel.

Figure 5:
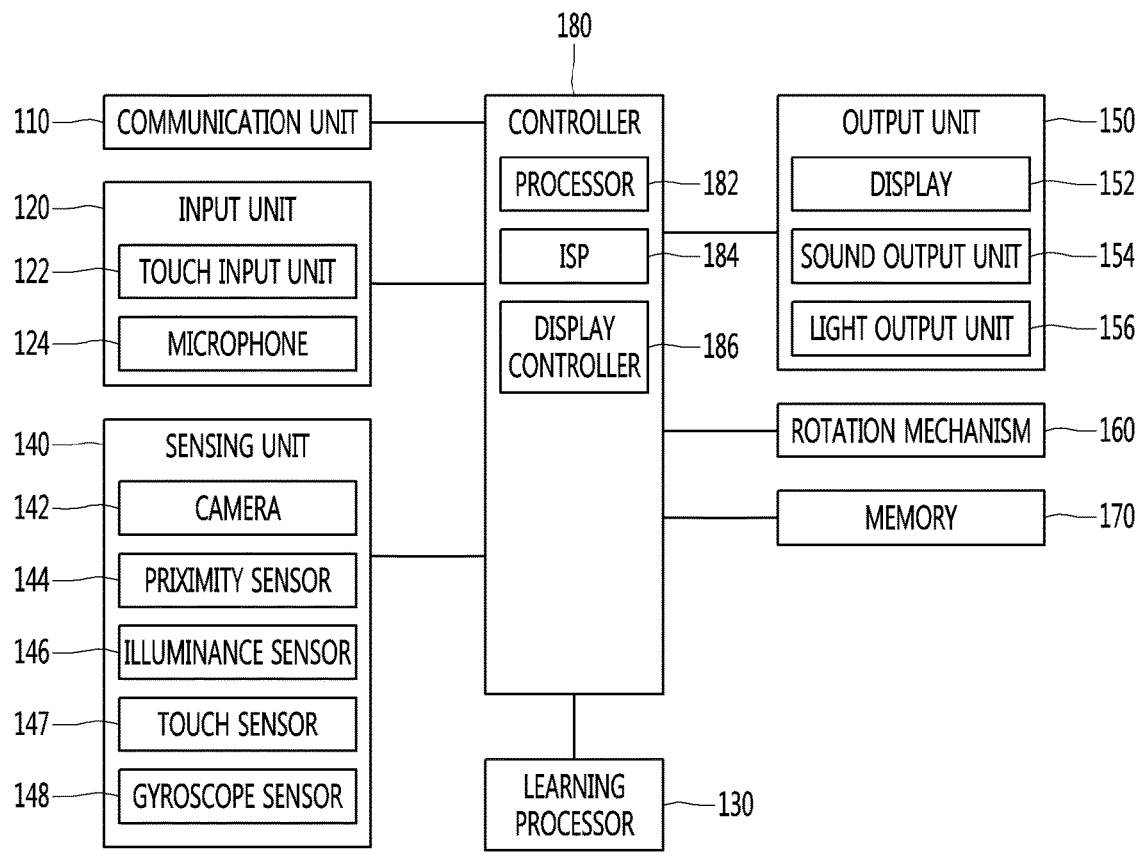
FIG. 5 is a block diagram showing the control configuration of a robot according to an embodiment of the present disclosure.

FIG. 5 is a block diagram showing the control configuration of a robot according to an embodiment of the present disclosure.

Referring to FIG. 5, the robot 100*a* may include a communication unit 110, an input unit 120, a learning processor 130, a sensing unit 140, an output unit 150, a rotation mechanism 160, a memory 170 and a control unit 180. The components shown in FIG. 5 are an example for convenience of description and the robot 100*a* may include more or fewer components than FIG. 5.

Meanwhile, the description of the AI device 100 described with reference to FIG. 1 is similarly applied to the robot 100*a* of the present disclosure and the repeated description of FIG. 1 will be omitted.

The communication unit 110 may include communication modules for connecting the robot 100*a* with a server, a mobile terminal or another robot through a network. The communication modules may support any one of the communication technologies described above with reference to FIG. 1.

For example, the robot 100*a* may be connected to the network through the access point such as the router. Therefore, the robot 100*a* may transmit a variety of information acquired through the input unit 120 or the sensing unit 140 to a server or a mobile terminal over the network. The information transmitted to the server may be stored in the server or transmitted to another electronic apparatus (a mobile terminal, a robot, etc.) connected to the server.

The input unit 120 may include at least input portion for acquiring various types of data. For example, the at least one input portion may include a physical input portion such as a button or a dial, a touch input unit 122 such as a touch pad or a touch panel, and a microphone 124 for receiving the voice of the user or the ambient sound of the robot 100*a*. A user may input various requests or commands to the robot 100*a* through the input unit 120.

Meanwhile, the processor 182 may transmit the voice data of the user received through the microphone 124 to the server through the communication unit 110. The server may analyze the voice data, recognize an activation word, a command word, a request, etc. in the voice data, and provide a result of recognition to the robot 100*a*. In some embodiments, the server may be implemented as the AI server 200 described with reference to FIG. 2. In this case, the server may recognize the activation word, the command word, the request, etc. in the voice data through a model (artificial neural network 231*a*) learned through the learning processor 240. The processor 182 may switch an operation mode based on the result of recognition or process the command word or the request.

In some embodiments, the processor 182 may directly recognize the activation word, the command word, the request, etc. in the voice data through the model learned by the learning processor 130 in the robot 100*a*. Alternatively, the processor 182 may receive data corresponding to the learned model from the server, store the data in the memory 170, and recognize the activation word, the command word, the request, etc. in the voice data through the stored data.

The sensing unit 140 may include at least one sensor for sensing a variety of information around the robot 100*a*. For example, the sensing unit 140 may include a camera 142, a proximity sensor 144, an illuminance sensor 146, a touch sensor 147, and a gyroscope sensor 148.

The camera 142 may acquire the image of the periphery of the robot 100*a*. In some embodiments, the control unit 180 may acquire an image including the face of the user through the camera 142 to recognize the user or acquire the gesture or expression of the user.

The proximity sensor 144 may detect that an object such as the user is approaching the robot 100*a*. For example, when approaching of the user is detected by the proximity sensor 144, the control unit 180 may output an initial screen or initial sound through the output unit 150 and induce the user to use the robot 100*a*.

The illuminance sensor 146 may detect brightness of a space where the robot 100*a* is disposed. The control unit 180 may control the components to perform various operations according to the result of detection of the illuminance sensor 146 and/or timeslot information.

The touch sensor 147 may detect that a part of the user's body touches a predetermined area of the robot 100*a*. For example, the touch sensor 147 may be disposed at the head part of the robot 100*a* and, more particularly, the upper or rear side of the face area including the display 152, without being limited thereto.

The gyroscope sensor 148 may detect the rotation angle or the slope of the robot 100*a*. The processor 182 may recognize the direction of the robot 100*a* or external impact based on the result of detection of the gyroscope sensor 148. For example, the gyroscope sensor 148 may be provided in the body part of the robot 100*a*, without being limited thereto.

The output unit 150 may output a variety of information or content related to the operation or state of the robot 100*a* and various services, programs or applications executed in the robot 100*a*. In addition, the output unit 150 may output various messages or information for performing interaction with the user.

The output unit 150 may include the display 152, the sound output unit 154 and the light output unit 156.

The display 152 may output the above-described various messages or information in a graphic form. In some embodiments, the display 152 may be implemented as a touchscreen along with the touch input unit 122. In this case, the display 152 may function not only as an output unit but also as an input unit.

The sound output unit 154 may output the various messages or information in the form of voice or sound. For example, the sound output unit 154 may include a speaker.

The light output unit 156 may be implemented as a light source such as an LED. The processor 182 may indicate the state of the robot 100*a* through the light output unit 156. In some embodiments, the light output unit 156 is an auxiliary output unit and may provide a variety of information to the user along with the display 152 and/or the sound output unit 154.

The rotation mechanism 160 may include components (a motor, etc.) for rotating the robot 100a about a vertical axis. The control unit 180 may control the rotation mechanism 160 to rotate the robot 100a, thereby changing the directions of the display 152 and the camera 142 of the robot 100a.

In some embodiments, the rotation mechanism 160 may further include components for tilting the robot 100a by a predetermined angle in a forward-and-backward direction.

Control data for controlling operations of the components included in the robot 100a, data for performing operation based on input acquired through the input unit 120 or information acquired through the sensing unit 140, etc. may be stored in the memory 170.

In addition, program data such as a software module or an application executed by at least one processor or controller included in the control unit 180 may be stored in the memory 170.

In addition, a graphical user interface (GUI) for expressing the emotion of the robot 100a through the display 152 may be stored in the memory 170 according to the embodiment of the present disclosure.

The memory 170 may include various storage devices such as a ROM, a RAM, an EPROM, a flash drive or a hard drive in hardware.

The control unit 180 may include at least one processor or controller for controlling operation of the robot 100a. Specifically, the control unit 180 may include at least one CPU, AP (application processor), microcomputer, integrated circuit, ASIC (application specific integrated circuit), etc.

For example, the control unit 180 may include the processor 182, an image signal processor (ISP) 184, and a display controller 186.

The processor 182 may control overall operation of the components included in the robot 100a. The ISP 184 may process an image signal acquired through the camera 142 and generate image data. The display controller 186 may control operation of the display 152 based on signals or data received from the processor 182. The display 152 may output graphics or text under control of the display controller 186.

In some embodiments, the ISP 184 and/or the display controller 186 may be included in the processor 182. In this case, the processor 182 may be implemented as an integrated processor for performing the functions of the ISP 184 and/or the display controller 186.

Meanwhile, the processor 182 may detect various types of physical stimuli using the touch sensor 147, the gyroscope sensor 148 and the touchscreen and provide the user with interaction corresponding to the detected physical stimuli.

In some embodiments, the processor 182 may stop (terminate) operation which is currently being performed (content output, etc.) as the physical stimuli is detected. That is, the user can easily stop or terminate operation of the robot 100a, by applying a simple physical stimulus to the robot 100a. Therefore, the user can rapidly or easily stop or terminate operation of the robot 100a in an emergency (reception of a phone call, ringing of a door bell, etc.).

Meanwhile, the processor 182 may transmit the sensing values of the touch sensor 147, the gyroscope sensor 148, and the touchscreen to the server through the communication unit 110. The server may analyze the sensing values, recognize physical stimuli corresponding to the sensing values and provide a result of recognition to the robot 100a. In some embodiments, the server may be implemented as the AI server 200 described with reference to FIG. 2. In this case, the server may recognize the physical stimuli corresponding to the sensing values through a model (artificial neural network 231a) learned through the learning processor 240.

Alternatively, the processor 182 may directly recognize the physical stimuli corresponding to the sensing values through the model learned by the learning processor 130 in the robot 100a. Alternatively, the processor 182 may receive data corresponding to the learned model from the server, store the data in the memory 170, and recognize the physical stimuli corresponding to the sensing values through the stored data.

The processor 182 may stop or terminate operation which is being performed when the physical stimuli are detected and switch the operation mode to a specific mode (a user concentration mode). In this regard, operation modes provided by the robot 100a according to the embodiment of the present disclosure will now be briefly described with reference to FIG. 6.

Figure 6:
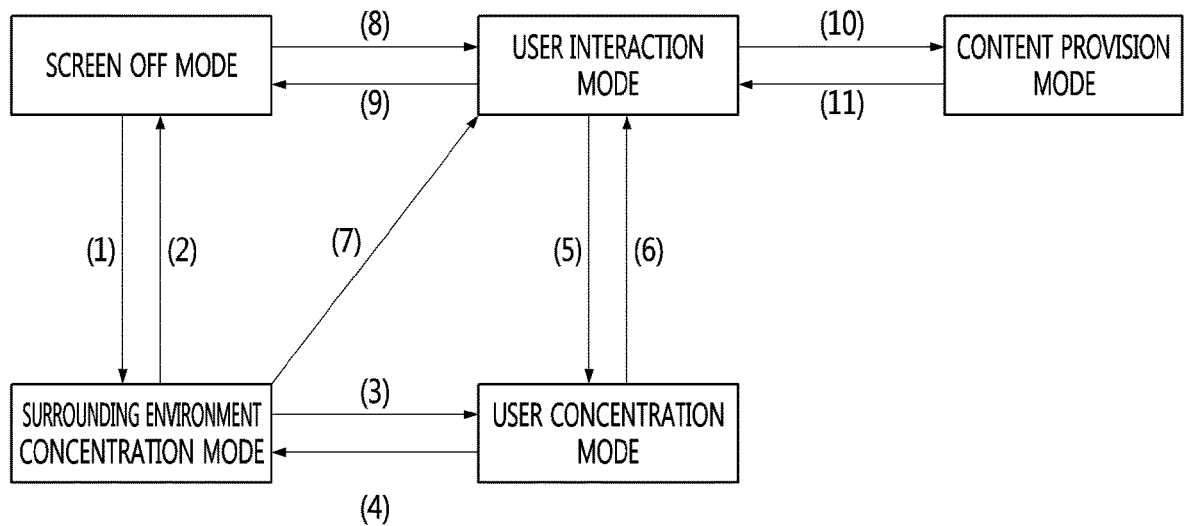
FIG. 6 is a view illustrating operation modes of a robot according to an embodiment of the present disclosure and switching of the operation modes.

FIG. 6 is a view illustrating operation modes of a robot according to an embodiment of the present disclosure and switching of the operation modes.

Referring to FIG. 6, the robot 100a may perform various operations and provide functions through a screen off mode, a surrounding environment concentration mode, a user concentration mode, a user interaction mode and a content provision mode.

Each operation mode will be briefly described. The screen off mode is a standby mode in which the camera 142 and the display 152 are turned off. However, in order to receive the voice (including the activation word or command) of the user or ambient sound, the microphone 124 may be maintained in the ON state.

The surrounding environment concentration mode may refer to a mode in which surrounding auditory and visual information is recognized using the microphone 124 and the camera 142. For example, in the surrounding environment concentration mode, the control unit 180 may receive the voice of the user or acquire the image of the user. In addition, the control unit 180 may turn the display 152 on to output information or a GUI for expressing the emotion of the robot 100a.

The user concentration mode may refer to a mode for providing a user experience such as focusing on a user, by recognizing the user (person) using the camera 142 and tracking the recognized user using the camera 142. The control unit 180 may continuously acquire an image through the camera 142 to recognize the position of the user (the position of the face, etc.) and control the rotation mechanism 160 such that the front surface of the robot 100a is directed to the recognized position. In addition, the control unit 180 may maintain the microphone 124 in the ON state and output information through the display 152 or output a GUI for expressing the emotion of the robot 100a.

The user interaction mode may refer to a mode for receiving a command or a request from a user and processing the received command or request or performing interaction with the user based on the command or request. For example, when an activation word or a command word (or a predetermined request) is recognized from voice received through the microphone 124, the control unit 180 may provide interaction based on the command word or the request through the display 152 or the sound output unit 154. In addition, the control unit 180 may track the user based on the image acquired through the camera 142. In addition, the control unit 180 may output a GUI for expressing the emotion of the robot 100a through the display 152.

The content provision mode may refer to a mode for providing a variety of content through the display 152 or the sound output unit 154. The content provision mode is a mode in which a separate application related to content is executed, and may be provided when functions (user tracking, activation word recognition, etc.) previously provided using the camera 142 or the microphone 124 are applied to the application.

In addition, the robot 100a may perform switching between the modes according to a specific condition. Some examples related to switching between the modes will now be described, but the present disclosure is not limited thereto.

(1) Switching from the screen off mode to the surrounding environment concentration mode: When a sound signal (voice, sound, etc.) having a predetermined level is acquired through the microphone 124

(2) Switching from the surrounding environment concentration mode to the screen off mode: When a sound signal having a predetermined level is not acquired through the microphone 124 for a predetermined time and an event or situation is not detected from the image acquired through the camera 142

(3) Switching from the surrounding environment concentration mode to the user concentration mode: When a user (person) is detected from the image acquired through the camera 142 or a physical stimulus (touch, shaking, external impact, etc.) is detected through the touch input unit 122, the touch sensor or the gyroscope sensor (4) Switching from the user concentration mode to the surrounding environment concentration mode: When the user (person) is no longer detected from the image acquired through the camera 142 or when separate input is not received through the input unit 120 for a predetermined time (5) Switching from the user interaction mode to the user concentration mode: When interaction (utterance, information display, etc.) according to the recognized command word (or the request) is terminated (6) Switching from the user concentration mode to the user interaction mode: when the activation word is included in the voice acquired through the microphone 124 (or when the activation word and the command word are included)

(7) Switching from the surrounding environment concentration mode to the user interaction mode: When the activation word is included in the voice acquired through the microphone 124 (or when the activation word and the command word are included)

(8) Switching from the screen off mode to the user interaction mode: When the activation word is included in the voice acquired through the microphone 124 (or when the activation word and the command word are included)

(9) Switching from the user interaction mode to the screen off mode: when a command for or input of turning the display 152 off is received

(10) Switching from the user interaction mode to the content provision mode: when a separate application is executed by a command or input

(11) Switching from the content provision mode to the user interaction mode: When the executed separate application is terminated In some embodiments, the content provision mode may be switched not only to the user interaction mode but also to another mode.

In addition, according to the embodiment of the present disclosure, when a physical stimulus is detected through at least one of the touch sensor 147, the gyroscope sensor 148 or the touchscreen while an operation is performed in the other operation modes excluding the screen off mode, the processor 182 may provide interaction based on the detected physical stimulus and switch the operation mode to the user concentration mode. Accordingly, it is possible to provide interaction according to the physical stimulus from the user and to more dynamically implement a robot for tracking the user according to the user concentration mode. Various embodiments related thereto will be described in detail with reference to FIGS. 7 to 13.

Figure 7:
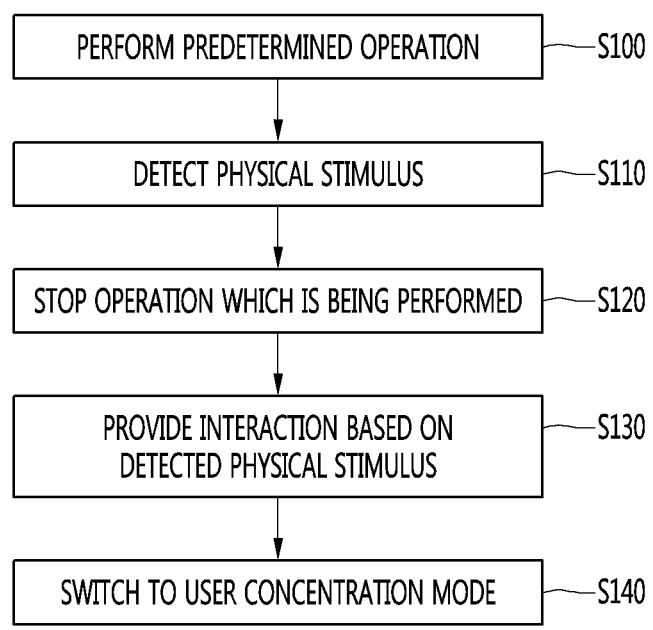
FIG. 7 is a flowchart illustrating control operation of a robot according to an embodiment of the present disclosure.

FIG. 7 is a flowchart illustrating control operation of a robot according to an embodiment of the present disclosure.

Referring to FIG. 7, the robot 100a may perform predetermined operation based on a current operation mode or input received through the input unit 120 (S100).

Since the screen off mode is a standby mode in which the robot 100a does not perform operation, the operation mode of the robot 100a may be any one of the modes excluding the screen off mode.

For example, when the operation mode of the robot 100a is the surrounding environment concentration mode, the user concentration mode or the user interaction mode, the processor 182 may perform operation to output a GUI indicating the emotional state of the robot 100a through the display 152. Meanwhile, when the operation mode of the robot 100a is the content provision mode, the processor 182 may perform operation to output a screen (an image, text, a web site screen, etc.) related to content through the display 152.

The robot 100a may detect a physical stimulus applied to the robot 100a by the user during the predetermined operation (S110).

For example, the physical stimulus may include various types of physical stimuli such as short touch or long touch (stroking) of the head part of the robot 100a, touch of the display 152, touch of the main body, or shaking or rotation of the robot 100a.

The processor 182 may detect that the physical stimulus is applied based on change in sensing value of at least one of the touch sensor 147, the gyroscope sensor 148 or the touchscreen.

In addition, the processor 182 may identify the type of the physical stimulus applied to the robot 100a based on the characteristics of the sensing value of at least one of the touch sensor 147, the gyroscope sensor 148 or the touchscreen.

The robot 100a may stop operation which is currently being performed in response to the physical stimulus (S120).

When the type of the physical stimulus is identified according to the characteristics of the sensing value of each of the touch sensor 147, the gyroscope sensor 148 and the touchscreen, the processor 182 may stop or terminate operation which is currently being performed.

Meanwhile, when the type of the physical stimulus is not identified according to the characteristics of the sensing value, the processor 182 may continuously perform operation which is currently being performed.

The robot 100a may provide interaction based on the detected physical stimulus (S130), and switch the operation mode to the user concentration mode (S140).

For example, information on the emotional state corresponding to each physical stimulus may be stored in the memory 170. In addition, a GUI or voice data corresponding to each emotional state may be stored in the memory 170.

The processor 182 may recognize the emotional state corresponding to the identified physical stimulus based on the information stored in the memory 170.

The processor 182 may load the GUI corresponding to the recognized emotional state from the memory 170 and display the loaded GUI through the display 152, thereby providing interaction based on the physical stimulus.

In some embodiments, the processor 182 may load the voice data corresponding to the recognized emotional state from the memory 170 and output the loaded voice data through the sound output unit (e.g., the speaker) 154.

In some embodiments, the processor 182 may further output light having a specific color or pattern through the light output units 156a and 156b.

In some embodiments, the processor 182 may control the rotation mechanism 160 to move the robot 100a, thereby further providing motion based on the emotional state.

In addition, the processor 182 may switch the operation mode of the robot 100a to the user concentration mode. As the operation mode is switched to the user concentration mode, the robot 100a may provide the user with a user experience such as the robot 100a focusing on the user, while tracking the user as described above.

Hereinafter, examples of various interactions provided by the robot 100a according to the physical stimulus will be described with reference to FIGS. 8 to 12.

FIGS. 8 to 12 are views showing operations of providing various interactions according to types of physical stimuli detected by a robot according to an embodiment of the present disclosure.

Figure 8:
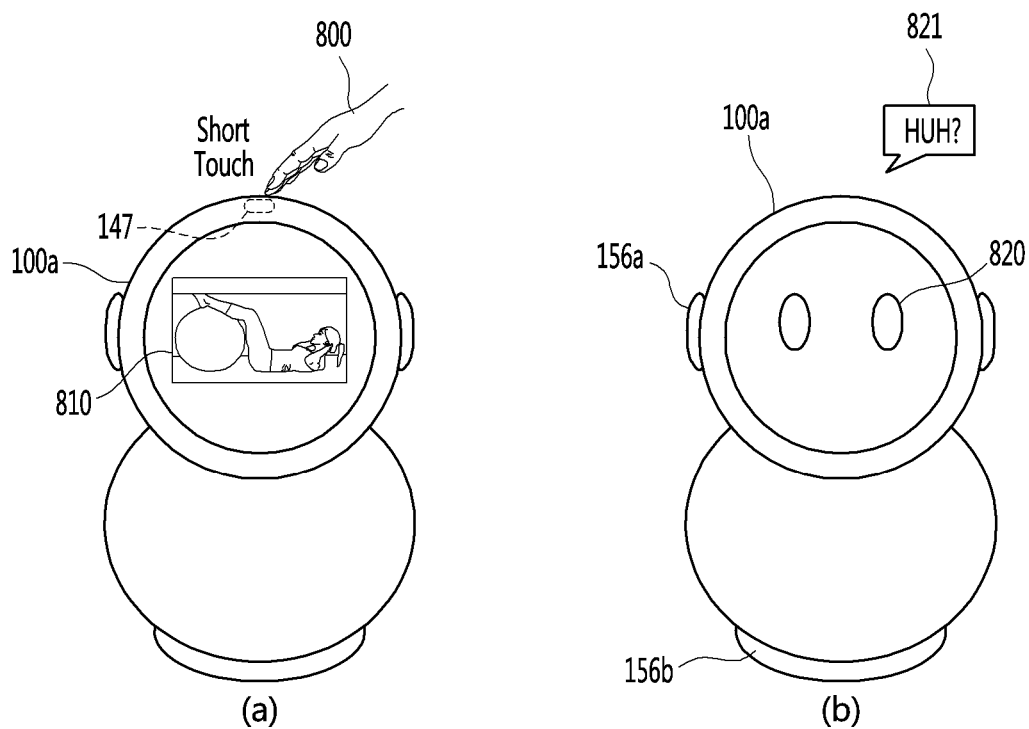
FIGS. 8 to 12 are views showing operations of providing various interactions according to types of physical stimuli detected by a robot according to an embodiment of the present disclosure.
Figure 8:
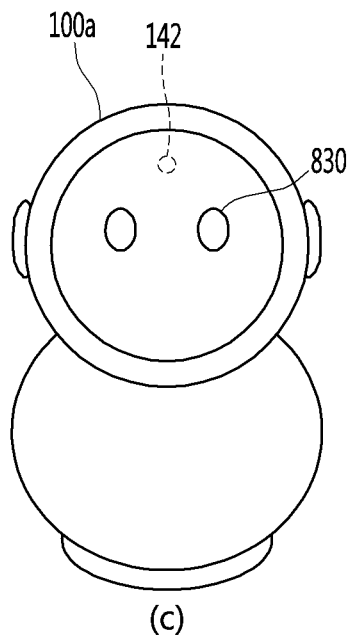

Referring to (a) to (c) of FIG. 8, the robot 100a may be providing image content 810 through the display 152. In this case, the operation mode of the robot 100a may be the content provision mode.

A user 800 may touch the head part of the robot 100a within a reference time. The reference time may be set to distinguish between short touch and long touch. The touch sensor 147 provided in the head part may detect touch of the user 800. For example, the sensing value acquired by the touch sensor 147 may be changed during touch of the user 800.

In contrast, the sensing value of the gyroscope sensor 148 may not be changed or may be changed within a reference value and the sensing value of the touchscreen may not be changed.

The processor 182 may acquire the sensing value each of the touch sensor 147, the gyroscope sensor 148 and the touchscreen. The processor 182 may confirm that only the sensing value of the touch sensor 147 has been changed within the reference time based on the acquired sensing value. In this case, the processor 182 may detect that a short touch type physical stimulus has been applied to the head part of the robot 100a.

The processor 182 may load information on the emotional state corresponding to the short touch type physical stimulus or a GUI corresponding to the emotional state from the memory 170. For example, the emotional state corresponding to the short touch type physical stimulus may be "surprise" and the GUI corresponds to "surprise" and may show increase in sizes of the eyes of the robot as compared to a basic expression.

The processor 182 may stop (or terminate) provision of the image content 810 based on the result of detection and output the loaded GUI 820 through the display 152. That is, the robot 100a may terminate provision of the image content 810 in response to a simple act of touching the head part, thereby increasing user convenience for operation of the robot 100a.

The robot 100a may provide the user 800 with a feeling (user experience) that the robot 100a is surprised by touch of the user 800 on the head part, by outputting the GUI 820.

In some embodiments, the processor 182 may output voice data 821 corresponding to the emotional state (surprise) through the sound output unit 154.

In some embodiments, the processor 182 may control the light output unit 156 to output light having a color or pattern corresponding to the emotional state (surprise).

In addition, the processor 182 may switch the operation of the robot 100a to the user concentration mode. The processor 182 may detect presence of the user using the camera 142 or the microphone 124 and track the user based on the image acquired through the camera 142. In addition, the processor 182 may output the GUI 830 corresponding to a basic emotional state through the display 152 in the user concentration mode, until predetermined input is received through the input unit 120 or a specific event is detected through the sensing unit 140.

Figure 9:
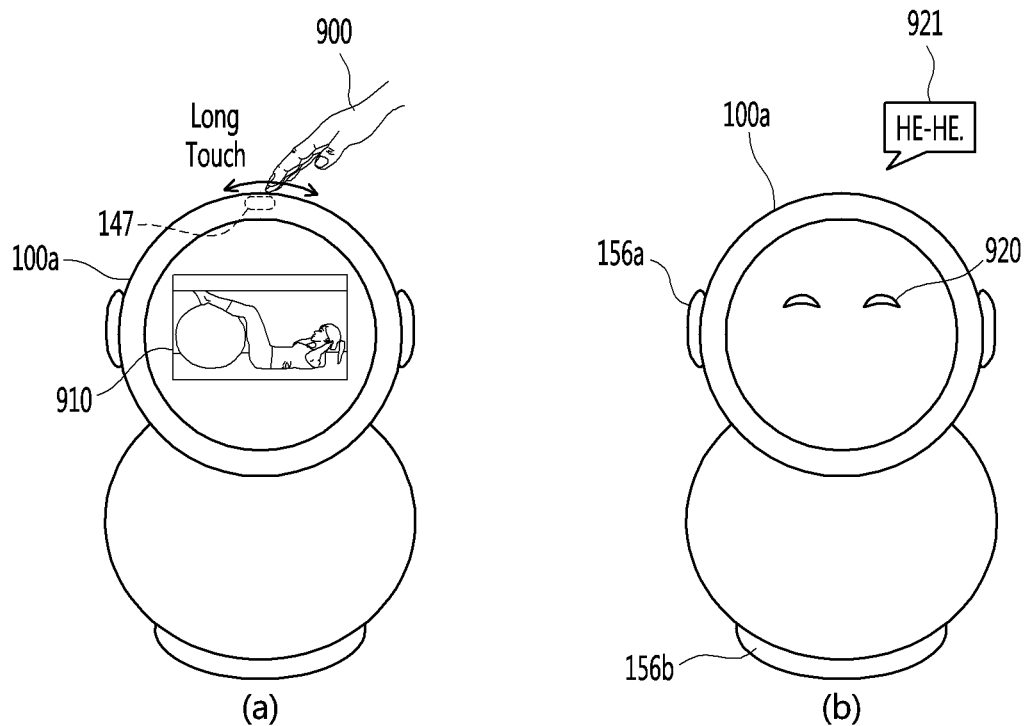
Figure 9:
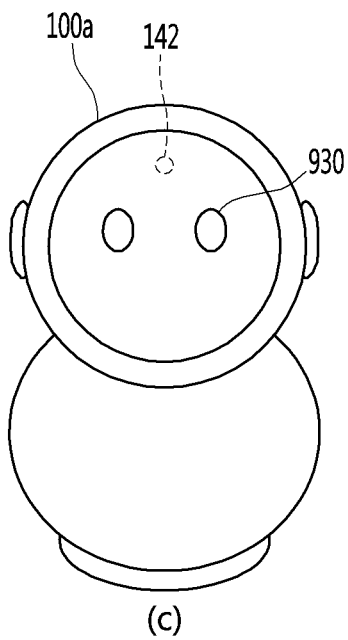

Referring to (a) to (c) of FIG. 9, the robot 100a may be providing image content 910 through the display 152 in the content provision mode similarly to FIG. 8.

For example, a user 900 may perform an act of stroking the head part of the robot 100a. In this case, the touch sensor 147 may detect a touch action (long touch) during a longer time than a reference time. Accordingly, the sensing value acquired by the touch sensor 147 may be changed during a longer time than the reference time.

In contrast, the sensing value of the gyroscope sensor 148 may not be changed or may be changed within a reference value and the sensing value of the touchscreen may not be changed.

The processor 182 may acquire the sensing value from each of the touch sensor 147, the gyroscope sensor 148 and the touchscreen. The processor 182 may confirm that only the sensing value of the touch sensor 147 has been changed for a longer time than the reference time based on the acquired sensing value. In this case, the processor 182 may detect that the user has applied a physical stimulus corresponding to stroking to the head part of the robot 100a.

The processor 182 may load information on the emotional state corresponding to stroking (or long touch) or a GUI corresponding to the emotional state from the memory 170. For example, the emotional state corresponding to stroking (long touch) may be "joy" and the GUI corresponds to "joy" and may show a smile in robot's eyes.

The processor 182 may stop (or terminate) provision of the image content 910 based on the result of detection and output the loaded GUI 920 through the display 152. That is, the robot 100a may terminate provision of the image content 910 in response to a simple act of stroking the head part, thereby increasing user convenience for operation of the robot 100a.

The robot 100a may provide the user 900 with a feeling (user experience) that the robot 100a is joyful by the act of stroking the head part, by outputting the GUI 920.

In some embodiments, the processor 182 may output voice data 921 corresponding to the emotional state (joy) through the sound output unit 154.

In some embodiments, the processor 182 may control the light output unit 156 to output light having a color or pattern corresponding to the emotional state (joy).

In addition, the processor 182 may switch the operation of the robot 100a to the user concentration mode. The processor 182 may detect presence of the user using the camera 142 or the microphone 124 and track the user based on the image acquired through the camera 142. In addition, the processor 182 may output a GUI 930 corresponding to a basic emotional state through the display 152 in the user concentration mode, until predetermined input is received through the input unit 120 or a specific event is detected through the sensing unit 140.

Figure 10:
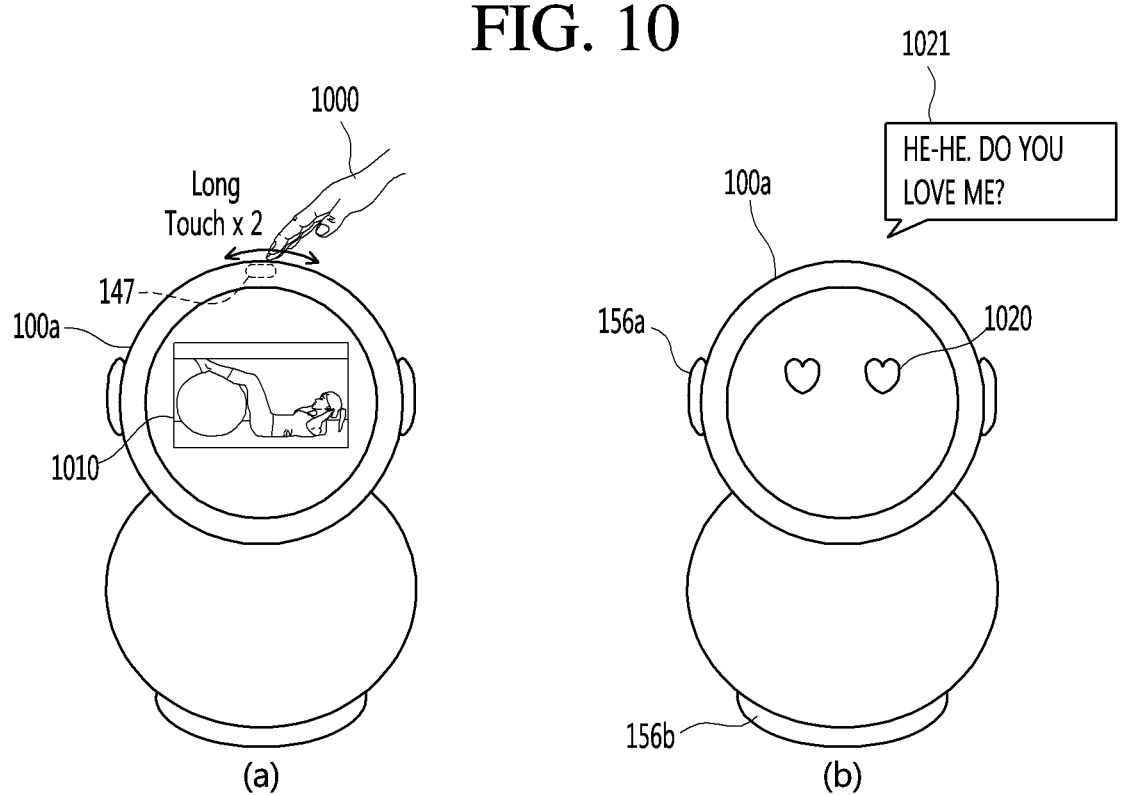
Figure 10:
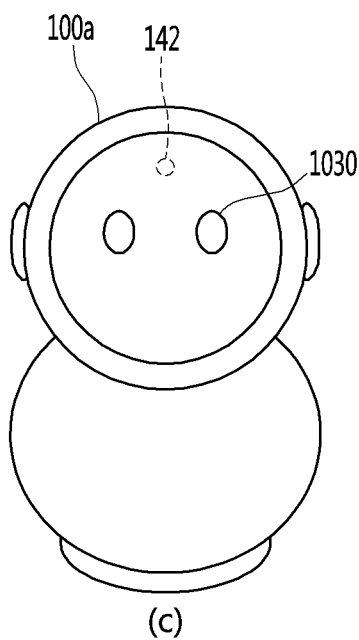

Meanwhile, referring to (a) to (c) of FIG. 10, when the same type of physical stimulus is repeated a predetermined number of times or more, the robot 100*a* may show an emotional state different from that when the physical stimulus is identified once.

For example, a user 1000 may repeatedly perform an act of stroking the head part of the robot 100*a* twice or more. In this case, the processor 182 may detect that the user has applied the physical stimulus corresponding to stroking to the head part of the robot 100*a* twice or more.

The processor 182 may load, from the memory 170, information on the emotional state corresponding to repetition of stroking (or long touch) twice or more or a GUI corresponding to the emotional state. For example, the emotional state corresponding to repetition of stroking (long touch) twice or more may be "love" and the GUI corresponds to "love" and may show heart-shaped eyes.

The processor 182 may stop (or terminate) provision of the image content 1010 based on the result of detection and output the loaded GUI 1020 through the display 152.

In some embodiments, the processor 182 may output voice data 1021 corresponding to the emotional state (love) through the sound output unit 154.

In some embodiments, the processor 182 may control the light output unit 156 to output light having a color or pattern corresponding to the emotional state (love).

That is, when a specific type of physical stimulus is repeatedly detected a predetermined number of times or more, the robot 100*a* may show an emotional state which varies according to the number of times of the physical stimulus, thereby more dynamically implementing a robot.

In addition, the processor 182 may switch the operation mode of the robot 100*a* to the user concentration mode. The processor 182 may detect presence of the user using the camera 142 or the microphone 124 and track the user based on the image acquired through the camera 142. In addition, the processor 182 may output a GUI 1030 corresponding to a basic emotional state through the display 152 in the user concentration mode, until predetermined input is received through the input unit 120 or a specific event is detected through the sensing unit 140.

Figure 11:
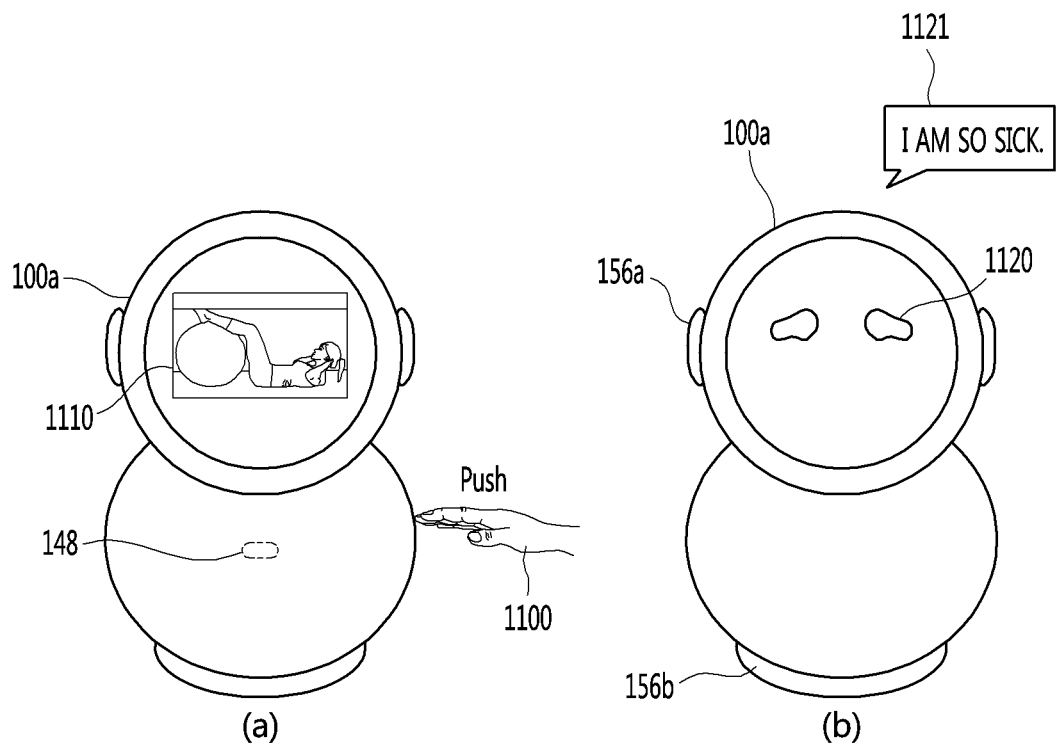
Figure 11:
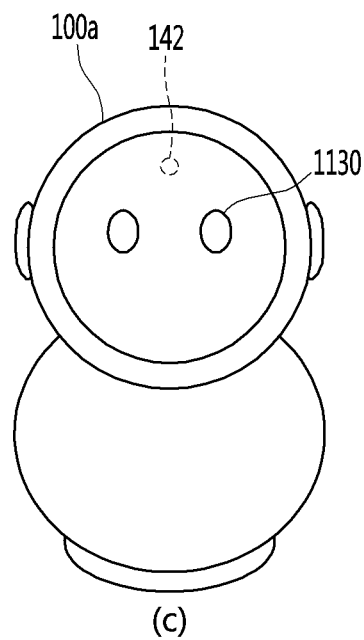

Referring to (a) to (c) of FIG. 11, the robot 100*a* may be providing image content 11110 through the display 152 in the content provision mode similarly to FIG. 8.

A user 1100 may perform an act of pushing the body part of the robot 100*a* in a certain direction. The robot 100*a* may be inclined in the certain direction or moved by a predetermined distance, by the physical stimulus of the user. At this time, the gyroscope sensor 148 provided in the body part may acquire a sensing value changed according to the inclination angle or movement distance of the robot by the act of the user 1100.

In contrast, the sensing value of the touch sensor 147 may not be changed or may be changed within a reference value and the sensing value of the touchscreen may not be changed.

The processor 182 may acquire the sensing value from each of the touch sensor 147, the gyroscope sensor 148 and the touchscreen. The processor 182 may confirm that only the sensing value of the gyroscope sensor 148 has been changed within the reference time based on the acquired sensing value. The processor 182 may detect that a physical stimulus that the user pushes the robot 100*a* in a predetermined direction, by recognizing that the robot 100*a* has been inclined or moved in the predetermined direction based on the sensing value of the gyroscope sensor 148.

The processor 182 may load information on the emotional state corresponding to the push type physical stimulus or a GUI corresponding to the emotional state from the memory 170. For example, the emotional state corresponding to the push type physical stimulus may be "badness" and the GUI corresponds to "badness". Although not shown, when the above-described physical stimulus is repeated a predetermined number of times, the emotional state corresponding thereto may be "sadness".

The processor 182 may stop (or terminate) provision of the image content 1110 based on the result of detection and output the loaded GUI 1120 through the display 152. That is, the robot 100*a* may terminate provision of the image content 1110 in response to a simple act of pushing the body part, thereby increasing user convenience for operation of the robot 100*a*.

In addition, the robot 100*a* may provide the user 1100 with a feeling (user experience) that the robot 100*a* feels bad by the act of pushing the body part, by outputting the GUI 1120.

In some embodiments, the processor 182 may output voice data 1121 corresponding to the emotional state through the sound output unit 154.

In some embodiments, the processor 182 may control the light output unit 156 to output light having a color or pattern corresponding to the emotional state.

In addition, the processor 182 may switch the operation of the robot 100*a* to the user concentration mode. The processor 182 may detect presence of the user using the camera 142 or the microphone 124 and track the user based on the image acquired through the camera 142. In addition, the processor 182 may output a GUI 1130 corresponding to a basic emotional state through the display 152 in the user concentration mode, until predetermined input is received through the input unit 120 or a specific event is detected through the sensing unit 140.

Figure 12:
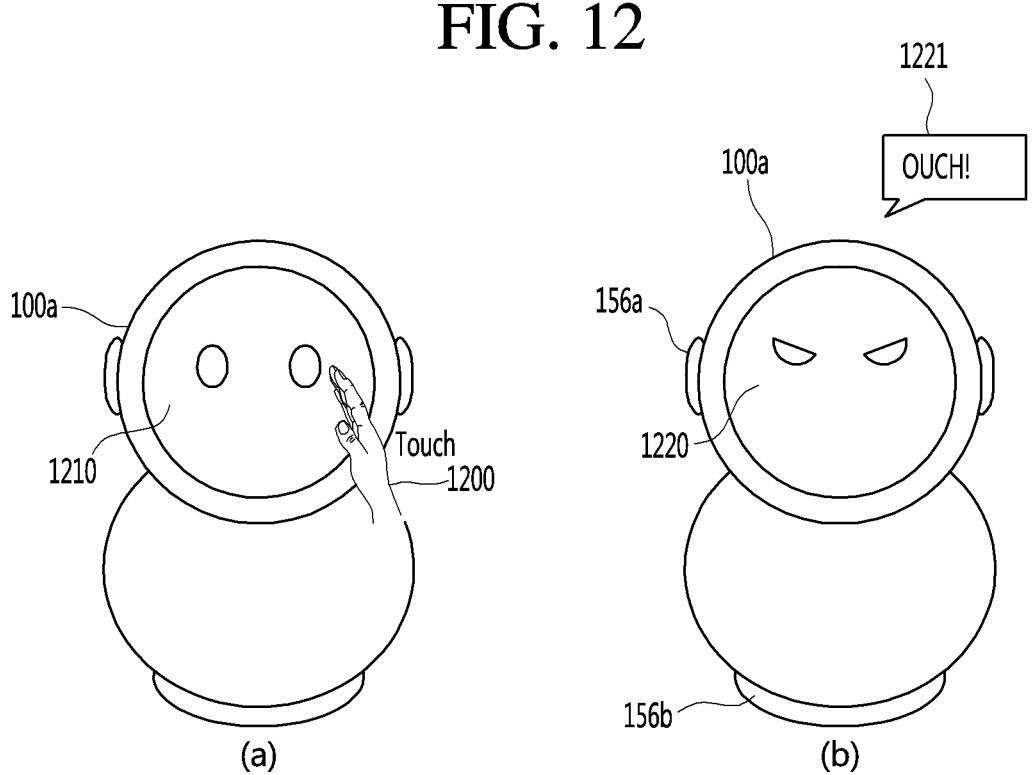
Figure 12:
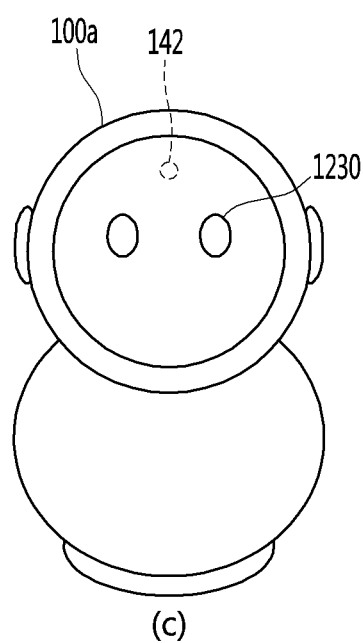

Referring to (a) to (c) of FIG. 12, the robot 100*a* may not provide content or information through the display 152, unlike the previous embodiments. In this case, the operation mode of the robot 100*a* may be the surrounding environment concentration mode or the user concentration mode. In this mode, the robot 100*a* may output a GUI 1210 corresponding to a basic emotional state through the display 152, in a state in which predetermined is not received through the input unit 120 or a specific event is not detected through the sensing unit 140.

A user 1200 may perform an act of touching a predetermined area of the display 152 of the robot 100*a*. When the display 152 is implemented as a touchscreen including the touch input unit 122, the touchscreen may detect touch of the user 1200. For example, the sensing value acquired by the touchscreen may be changed during touch of the user 1200.

In contrast, the sensing values of the touch sensor 147 and the gyroscope sensor 148 may not be changed or may be changed within a reference value.

The processor 182 may acquire the sensing value from each of the touch sensor 147, the gyroscope sensor 148 and the touchscreen. The processor 182 may detect that a touch type physical stimulus has been applied to the face (touchscreen) of the robot 100*a*, by confirming that only the sensing value of the touchscreen has been changed based on the acquired sensing value.

The processor 182 may load information on the emotional state corresponding to the touch type physical stimulus applied to the face or a GUI corresponding to the emotional state from the memory 170. For example, the emotional state corresponding to the above-described physical stimulus may be "annoyance" and the GUI may correspond to "annoyance".

The processor 182 may output the loaded GUI 1220 through the display 152 based on the result of detection, instead of the GUI 1210 corresponding to the basic expression.

That is, the robot 100*a* may provide the user 1200 with a feeling (user experience) that the robot 100*a* is annoyed by the user 1200 touching the face of the robot 100*a*, by outputting the GUI 1220.

In some embodiments, the processor 182 may output voice data 1221 corresponding to the emotional state through the sound output unit 154. In some embodiments, the processor 182 may control the light output unit 156 to output light having a color or pattern corresponding to the emotional state.

In addition, the processor 182 may switch the operation of the robot 100*a* to the user concentration mode. The processor 182 may detect presence of the user using the camera 142 or the microphone 124 and track the user based on the image acquired through the camera 142. In addition, the processor 182 may output a GUI 1230 corresponding to a basic emotional state through the display 152 in the user concentration mode, until predetermined input is received through the input unit 120 or a specific event is detected through the sensing unit 140.

That is, according to the embodiments shown in FIGS. 7 to 12, the robot 100*a* may detect and identify various types of physical stimuli using various sensors such as the touch sensor 147, the gyroscope sensor 148 and the touchscreen. The robot 100*a* may perform more dynamic interaction with the user, by showing various emotional states according to the identified physical stimuli.

Meanwhile, FIGS. 7 to 12 show only examples of detecting and identifying the physical stimulus according to change in sensing value of any one of the touch sensor 147, the gyroscope sensor 148 and the touchscreen. However, the robot 100*a* may detect and identify a physical stimulus corresponding to the characteristics of the changed sensing values as the sensing values of two or more of the sensors are changed.

In addition, the robot 100*a* may stop or terminate operation which is being performed when the above-described physical stimulus is detected while operation such as output of a variety of content or information is performed. That is, the user can easily and rapidly stop or terminate operation of the robot 100*a* in an emergency such as reception of a phone call or ringing of a door bell while the robot 100*a* is being used, thereby increasing use convenience.

Figure 13:
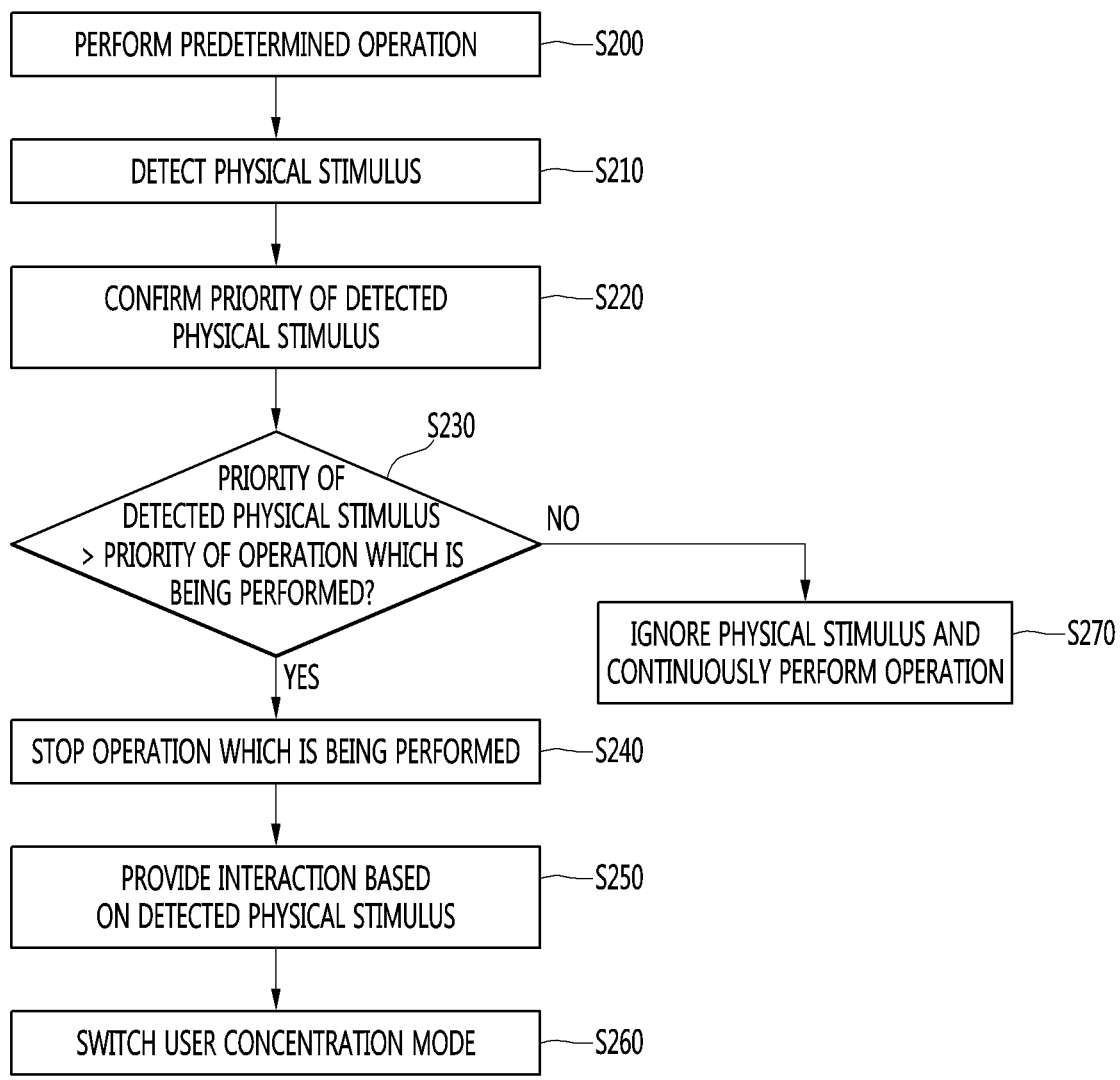
FIG. 13 is a flowchart illustrating control operation of a robot according to another embodiment of the present disclosure.

FIG. 13 is a flowchart illustrating control operation of a robot according to another embodiment of the present disclosure.

Referring to FIG. 13, steps S200 to S210 are substantially equal to steps S100 and S110 of FIG. 7 and a description thereof will be omitted.

The robot 100*a* may confirm priority of the detected physical stimulus (S220).

The processor 182 may confirm the priority of the detected and identified physical stimulus.

For example, information on the priority of each type of physical stimulus may be stored in the memory 170.

The information on the priority of each type of physical stimulus may include priorities of physical stimuli. For example, the characteristics of the sensing value acquired from at least one of the touch sensor 147, the gyroscope sensor 148 or the touchscreen according to the physical stimulus applied to the robot 100*a* may be related to a plurality of physical stimuli. In this case, the processor 182 may identify a physical stimulus having highest priority among the plurality of related physical stimuli as a physical stimulus applied to the robot 100*a*, based on the priorities of the physical stimuli. For example, the priority of short touch of the touch sensor 147 may be higher than that of long touch (stroking) of the touch sensor 147, without being limited thereto.

In addition, the information on the priority of each type of physical stimulus may include information on priorities of various operations (functions) performed by the robot 100*a* and the physical stimuli and/or information on the priorities of the operation modes of the robot 100*a* and the physical stimuli. Based on this, the robot 100*a* may provide interaction according to the physical stimulus or continuously perform operation which is being performed, according to the priorities of the identified physical stimulus and operation which is currently being performed.

Meanwhile, the information on the priority of each type of physical stimulus may be predetermined when the product is released or may be set and changed by the user in some embodiments.

When the priority of the detected physical stimulus is higher than that of operation which is currently being performed (YES of S230), the robot 100*a* stops (terminates) operation which is currently being performed (S240), provides interaction based on the detected physical stimulus (S250), and switch the operation mode to the user concentration mode (S260).

Steps S240 to S260 may be substantially equal to steps S120 to S140 of FIG. 7.

For example, the processor 182 may detect a touch type physical stimulus through the touch sensor 147 while an image is output through the display 152. The processor 182 may confirm that the priority of the touch type physical stimulus is higher than that of operation to output the image, from the information on the priorities stored in the memory 170. In this case, the processor 182 may stop or terminate the output of the image in response to the touch type physical stimulus, output a GUI based on the touch type physical stimulus, and switch the operation mode to the user concentration mode.

In contrast, when the priority of the detected physical stimulus is lower than that that of operation which is currently being performed (NO of S230), the robot 100*a* may ignore the detected physical stimulus and continuously perform operation which is currently being performed (S270).

For example, the processor 182 may detect a physical stimulus corresponding to push of the body part through the gyroscope sensor 148 while an image is output through the display 152. The processor 182 may confirm that the priority of the physical stimulus corresponding to push of the body part is lower than that of operation to output the image, from the information on the priorities stored in the memory 170. In this case, the processor 182 may continuously perform operation to output the image without outputting a GUI for the physical stimulus.

That is, according to the embodiment shown in FIG. 13, the robot 100*a* may determine whether the physical stimulus is processed based on the priorities of the physical stimuli and operations (functions). For example, the robot 100a may set the priority of a physical stimulus little related to the intention of the user to be low, and perform control to continuously perform operation which is currently being performed when the physical stimulus is detected. Therefore, the robot 100a can solve user inconvenience caused when operation is terminated regardless of the intention of the user. In addition, the robot 100a can solve user inconvenience caused when operation is frequently stopped or terminated due to various types of physical stimuli.

According to the embodiment of the present disclosure, the robot can detect and identify various types of physical stimuli using various sensors such as a touch sensor, a gyroscope sensor and a touchscreen. The robot may more dynamically perform interaction with a user, by showing various emotional states according to an identified physical stimulus. As a result, it is possible to solve user's repulsion toward use of the robot.

In addition, the robot can stop or terminate operation which is being performed when a physical stimulus is detected while operation such as output of a variety of content or information is performed. That is, a user can easily and rapidly stop or terminate operation of the robot in an emergency such as reception of a phone call or ringing of a door bell while the robot is being used, thereby increasing use convenience.

In addition, the robot may determine whether the physical stimulus is processed based on the priorities of the physical stimuli and operations (functions). For example, the robot may set the priority of a physical stimulus little related to the intention of the user to be low, and perform control to continuously perform operation which is currently being performed when the physical stimulus is detected. Therefore, the robot can solve user inconvenience caused when operation is terminated regardless of the intention of the user. In addition, the robot can solve user inconvenience due to frequent stop or termination of operation by various types of physical stimuli.

The foregoing description is merely illustrative of the technical idea of the present disclosure, and various changes and modifications may be made by those skilled in the art without departing from the essential characteristics of the present disclosure.

Therefore, the embodiments disclosed in the present disclosure are to be construed as illustrative and not restrictive, and the scope of the technical idea of the present disclosure is not limited by these embodiments.

The scope of the present disclosure should be construed according to the following claims, and all technical ideas within equivalency range of the appended claims should be construed as being included in the scope of the present disclosure.

What is claimed is:

1. A robot comprising:
 a display;
 a sensing unit including at least one sensor for detecting a physical stimulus; and
 a processor configured to:
 detect the physical stimulus based on a sensing value acquired from the at least one sensor while an operation is performed,
 identify the physical stimulus based on the acquired sensing value,
 perform control to stop or terminate the operation based on the identified physical stimulus, and
 control the display to display a graphical user interface (GUI) corresponding to the identified physical stimulus,
 wherein the robot further comprises a memory configured to store information on priorities of identifiable physical stimuli and performable operations, and
 wherein the processor is configured to perform control to stop or terminate the operation which is being performed or ignore the identified physical stimulus based on priority of the identified physical stimulus and priority of the operation which is being performed.

2. The robot according to claim 1, wherein the at least one sensor includes at least one of:
 a touch sensor provided in a head part of the robot;
 a gyroscope sensor provided in a body part of the robot; or
 a touchscreen formed integrally with the display.

3. The robot according to claim 1, further comprising a memory configured to store a learning model learned by a learning processor or received from a server,
 wherein the processor identifies the physical stimulus corresponding to the sensing value acquired from the at least one sensor through the learning model stored in the memory.

4. The robot according to claim 1, wherein the processor:
 stops or terminates the operation which is being performed when the priority of the identified physical stimulus is higher than that of the operation which is being performed, and
 controls the display to display the GUI corresponding to the identified physical stimulus.

5. The robot according to claim 1, wherein the processor ignores the identified physical stimulus and continuously performs the operation, when the priority of the identified physical stimulus is lower than that of the operation which is being performed.

6. The robot according to claim 1, wherein the processor continuously performs the operation when identification of the detected physical stimulus is impossible.

7. The robot according to claim 1, further comprising a speaker,
 wherein the processor controls the speaker to output voice corresponding to the identified physical stimulus.

8. The robot according to claim 1, further comprising a camera,
 wherein the processor recognizes a position of a user through the camera in response to the identified physical stimulus and controls a rotation mechanism such that the display is directed to the recognized position.

9. The robot according to claim 1, wherein the GUI indicates an emotional state corresponding to the identified physical stimulus.

10. The robot according to claim 1, wherein, when detecting that the physical stimulus is repeated a predetermined number of times or more based on the acquired sensing value, the processor controls the display to display a GUI different from a GUI displayed when the physical stimulus is identified once.

11. A method of controlling a robot, the method comprising:
 acquiring a sensing value from at least one sensor while an operation is performed;
 detecting a physical stimulus based on the acquired sensing value;
 identifying the detected physical stimulus based on the acquired sensing value;

performing control to stop or terminate the operation based on the identified physical stimulus; and outputting a graphical user interface (GUI) corresponding to the identified physical stimulus through a display, wherein performing control to stop or terminate the operation based on the identified physical stimulus and outputting the GUI corresponding to the identified physical stimulus are performed based on priority of the identified physical stimulus being higher than that of the operation which is being performed.

12. The method according to claim 11, wherein the at least one sensor includes at least one of:

a touch sensor provided in a head part of the robot;

a gyroscope sensor provided in a body part of the robot; or a touchscreen formed integrally with the display.

13. The method according to claim 11, wherein the identifying of the physical stimulus includes identifying the physical stimulus corresponding to the sensing value acquired from the at least one sensor through a learning model learned by a learning processor or received from a server.

14. The method according to claim 11, wherein the performing of control to stop or terminate the operation based on the identified physical stimulus and the outputting of the GUI corresponding to the identified physical stimulus are not performed when priority of the identified physical stimulus is lower than that of the operation which is being performed.

15. The method according to claim 11, further comprising continuously performing the operation when identification of the detected physical stimulus is impossible.

16. The method according to claim 11, wherein the outputting of the GUI corresponding to the identified physical stimulus through the display further includes outputting voice corresponding to the identified physical stimulus through a speaker.

17. The method according to claim 11, further comprising recognizing a position of a user through a camera in response to the identified physical stimulus and controlling a rotation mechanism such that the display is directed to the recognized position.

18. The method according to claim 11, wherein the displaying of the GUI through the display includes, when detecting that the physical stimulus is repeated a predetermined number of times or more based on the acquired sensing value, displaying a GUI different from a GUI displayed when the physical stimulus is identified once.

* * * * *